United States Patent
Krojzl et al.

(10) Patent No.: US 11,748,206 B2
(45) Date of Patent: Sep. 5, 2023

(54) DATA RECOVERY MODIFICATION BASED ON PERFORMANCE DATA EXHIBITED BY A NETWORK OF DATA CENTERS AND DATA RECOVERY REQUIREMENT

(71) Applicant: International Business Machines Corporation, Armonk, NY (US)

(72) Inventors: Tomas Krojzl, Brno (CZ); Erik Rueger, Ockenheim (DE); Sharathchandra Pankanti, Darien, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 212 days.

(21) Appl. No.: 16/554,030

(22) Filed: Aug. 28, 2019

(65) Prior Publication Data
US 2021/0064480 A1 Mar. 4, 2021

(51) Int. Cl.
*G06F 11/14* (2006.01)
*G06N 20/00* (2019.01)

(52) U.S. Cl.
CPC ...... *G06F 11/1464* (2013.01); *G06F 11/1469* (2013.01); *G06N 20/00* (2019.01); *G06F 2201/84* (2013.01)

(58) Field of Classification Search
CPC ............ G06F 11/1464; G06F 11/1469; G06F 11/1461; G06F 2201/84; G06N 20/00
See application file for complete search history.

(56) References Cited

U.S. PATENT DOCUMENTS 5,367,698 A * 11/1994 Webber ............... G06F 16/119
709/219
7,325,019 B2   1/2008 Lam et al.
(Continued)

FOREIGN PATENT DOCUMENTS

CN        1577276 A    2/2005
CN      103547994 A    1/2014
(Continued)

OTHER PUBLICATIONS

"Based on the movement of the traffic prediction front light transmitting network bandwidth adjustment method and device" by Ji, Zhang, Zhang and Bai Machine Translation of Foreign Patent CN 110839184-A published Feb. 25, 2020 (Year: 2020).*
(Continued)

*Primary Examiner* — Matthew M Kim
*Assistant Examiner* — Matthew N Putaraksa
(74) *Attorney, Agent, or Firm* — Amin, Turocy & Watson, LLP

(57) ABSTRACT

Techniques regarding adaptive data recovery schemes are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a data management component that can modify a data recovery scheme based on performance data exhibited by a network of data centers and a data recovery requirement. The data recovery scheme can direct a relocation of data within the network.

23 Claims, 14 Drawing Sheets

(56) References Cited

U.S. PATENT DOCUMENTS

| | | | |
|---|---|---|---|
| 7,395,352 | B1 | 7/2008 | Lam et al. |
| 8,132,043 | B2 | 3/2012 | Dash et al. |
| 8,572,431 | B2 | 10/2013 | Adler et al. |
| 9,465,827 | B1 | 10/2016 | Cox et al. |
| 10,021,185 | B1* | 7/2018 | Kleinschnitz, Jr. ... G06F 9/5011 |
| 10,270,644 | B1* | 4/2019 | Valsecchi ............ H04L 41/0681 |
| 10,296,255 | B1* | 5/2019 | Tummala ................ G06F 3/065 |
| 11,010,410 | B1* | 5/2021 | Annamalai ........... G06F 16/182 |
| 11,405,329 | B1* | 8/2022 | Cuthbert ................. H04L 67/52 |
| 2003/0065762 | A1* | 4/2003 | Stolorz ................... H04L 67/18 709/223 |
| 2011/0282982 | A1 | 11/2011 | Jain |
| 2012/0297238 | A1 | 11/2012 | Watson et al. |
| 2014/0046917 | A1* | 2/2014 | Smith ................ G06F 16/2228 707/696 |
| 2014/0098685 | A1* | 4/2014 | Shattil ................... H04L 67/327 370/252 |
| 2014/0173229 | A1* | 6/2014 | Reohr ..................... G06F 3/067 711/162 |
| 2015/0317220 | A1 | 11/2015 | Sampath et al. |
| 2015/0331752 | A1 | 11/2015 | Haider et al. |
| 2016/0226745 | A1* | 8/2016 | Tran ................... H04N 21/2181 |
| 2017/0060900 | A1 | 3/2017 | Marinov et al. |
| 2018/0069925 | A1 | 3/2018 | Lavasani |
| 2018/0077080 | A1* | 3/2018 | Gazier ................ H04L 43/0817 |
| 2018/0102985 | A1 | 4/2018 | Byers et al. |
| 2018/0227240 | A1* | 8/2018 | Liu ..................... H04L 67/1029 |
| 2019/0138287 | A1 | 5/2019 | De Capoa et al. |
| 2019/0171966 | A1 | 6/2019 | Rangasamy et al. |
| 2019/0188089 | A1 | 6/2019 | Mueller et al. |
| 2019/0250998 | A1* | 8/2019 | Bedadala ............ G06F 11/1469 |
| 2019/0268216 | A1* | 8/2019 | Wu ..................... G06F 11/3495 |
| 2020/0004569 | A1* | 1/2020 | Gupta ................... G06F 9/5072 |
| 2020/0125453 | A1* | 4/2020 | Kommera ........... G06F 11/1464 |
| 2020/0125545 | A1* | 4/2020 | Idicula .................. G06F 16/217 |
| 2020/0379807 | A1* | 12/2020 | Tang ....................... G06F 9/505 |
| 2020/0387433 | A1* | 12/2020 | Wang .................... H04L 9/3239 |
| 2021/0127241 | A1* | 4/2021 | Moubayed ............ G06F 9/5066 |
| 2021/0271549 | A1* | 9/2021 | Khayat .................. G06N 20/00 |
| 2021/0398073 | A1* | 12/2021 | Mishra ................. G06Q 10/087 |
| 2022/0141130 | A1* | 5/2022 | Sum Wong ......... H04L 12/4641 370/392 |

FOREIGN PATENT DOCUMENTS

| | | |
|---|---|---|
| CN | 103873546 A | 6/2014 |
| CN | 107402851 A | 11/2017 |
| CN | 108337260 A | 7/2018 |
| CN | 109144967 A | 1/2019 |
| CN | 109844728 A | 6/2019 |
| WO | 2010/039151 A1 | 4/2010 |

OTHER PUBLICATIONS

"Disaster Recovery as a Service Market by Service Type (Backup & Recovery, Real-Time Replication, Data Protection and Professional Services), Service Provider, Deployment Model, Organization Size, Vertical, and Region—Global Forecast to 2022" https://www.marketsandmarkets.com/Market-Reports/recovery-as-a-service-market-962.html. Last Accessed Aug. 20, 2019. 10 pages.

Mankatala. "Optimization of Disaster Recovery Leveraging Enterprise Architecture Ontology" The Ohio State University Graduate Program in Computer Science and Engineering (2013) https://eld.ohiolink.edu/rws_etd/document/get/osu1374206497/inline. 70 pages.

Mell, Peter, et al. "The NIST Definition of Cloud Computing." National Institute of Standards and Technology. Sep. 2011. 7 pages.

Invitation to pay additional fee received for PCT Application Serial No. PCT/EP2020/070789 dated Nov. 16, 2020, 12 pages.

International Search Report and Written Opinion for International Application No. PCT/EP2020/070789 dated Apr. 3, 2021.

Chinese Office Action for Chinese Application No. 202080059323.1 dated Oct. 21, 2022.

Communication pursuant to Article 94(3) EPC for EP Application No. 20746169.0 dated Feb. 17, 2023.

Chinese Office Action received for CN Patent Application Serial No. 202080059323.1 dated Jan. 28, 2023, 14 pages.

Chinese Office Action received for CN Patent Application Serial No. 202080059323.1 dated May 23, 2023, 5 pages.

Ying, W et al. | "Survey of mobility prediction in wireless network." Journal on Communications, vol. 40 No. 8, Aug. 2019, 12 pages.

Yong, J. | "Design of Infrastructure Based on Micro-services Architecture." Computer Engineering & Software, 2016, vol. 37, No. 5, 5 pages.

Ahmad, N. et I. | "Strategy and procedures for Migration to the Cloud Computing." 2018 IEEE 5th International Conference on Engineering Technologies & Applied Sciences, Nov. 22- 23, 2018, Bangkok Thailand. 5 pages.

* cited by examiner

DATA RECOVERY MODIFICATION BASED ON PERFORMANCE DATA EXHIBITED BY A NETWORK OF DATA CENTERS AND DATA RECOVERY REQUIREMENT

BACKGROUND

The subject disclosure relates to the management of data relocation in one or more networks of data centers, and more specifically, to optimizing one or more data recovery schemes that can direct the distribution of data within the one or more networks of data centers.

Data recovery schemes can be utilized to replicate and transfer data from a primary source to facilitate recovery of the data in the event that the primary source is compromised. Traditional database recovery is designed as a direct source to a target database replication that is predetermined and remains static over time. For example, conventional data recovery schemes can direct the replication and/or transfer of data from a primary data center, where the data is primarily sourced and/or executed, to one or more secondary data centers in response to one or more operation failures associated with the primary data center. The one or more secondary data centers can be predetermined prior to execution of the data recovery scheme. Further, once the secondary data centers are predetermined, their status as relocation destinations typically remains constant throughout the operation of the primary data center.

However, conventional data recovery schemes can fail to account for multiple characteristics of the data and/or data centers that can change over time. For instance, operation requirements for executing the data and/or performance characteristics of the one or more data centers can change subsequent to establishment of the data recovery scheme. By targeting static secondary data centers for data relocation, conventional data recovery schemes can be substantially more inefficient in execution than originally designed.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can optimize one or more data recovery schemes are described.

According to an embodiment, a system is provided. The system can comprise a memory that stores computer executable components. The system can also comprise a processor, operably coupled to the memory, and that can execute the computer executable components stored in the memory. The computer executable components can comprise a data management component that can modify a data recovery scheme based on performance data exhibited by a network of data centers and a data recovery requirement. The data recovery scheme can direct a relocation of data within the network. An advantage of such a system can be the generation of data recovery schemes adapted to measured performance characteristics of the given network data centers.

In some examples, the data management component can modify the data recovery scheme to generate a modified data recovery scheme. Also, the system can comprise an assessment component that can analyze the modified data recovery scheme to determine whether the modified data recovery scheme is predicted to achieve improved performance data and meet the data recovery requirement in comparison to the data recovery scheme. Further, the system can comprise a relocation component that can perform the relocation of the data in accordance with the modified data recovery scheme based on the assessment component determining that the modified data recovery scheme is predicted to improve the performance data and meet the data recovery requirement. An advantage of such a system can be that an autonomous assessment of proposed changes can enable iterative optimization processes.

According to an embodiment, a system is provided. The system can comprise a memory that stores computer executable components. The system can also comprise a processor, operably coupled to the memory, and that can execute the computer executable components stored in the memory. The computer executable components can comprise a data management component that can generate a machine learning model to determine a modification to a data recovery scheme based on performance data exhibited by a network of data centers and a data recovery requirement. The data recovery scheme can direct a relocation of data within the network. An advantage of such a system can be that the autonomous nature of the system can maintain the confidentiality of data while also enabling adjustment to the data recovery scheme.

In some examples, the performance data can comprise at least one member selected from a group consisting of location of the data centers, bandwidth of the network, latency of the network, bandwidth used by the data, latency exhibited during execution of the data, and latency exhibited during the relocation of the data. Also, the data recovery requirement can comprise at least one second member selected from a second group consisting of the location of the data centers and a service level objective. An advantage of such a system can be that the achievement of one or more target service level objects, such as latency targets, can be enhanced with a data recovery scheme that can be actualized by the capacities of the network of data centers.

According to an embodiment, a computer-implemented method is provided. The computer-implemented method can comprise generating, by a system operatively coupled to a processor, a machine learning model to determine a modification to a data recovery scheme based on performance data exhibited by a network of data centers and a data recovery requirement. The data recovery scheme can direct a relocation of data within the network. An advantage of such a computer-implemented method can be that data relocation destinations (e.g., secondary data centers), can be readily changed and/or altered based on the operation characteristics of the data and/or the data centers.

In some examples, the performance data can regard a group of microservice applications comprised within the data and at least one data center of the network. Also, the computer-implemented method can comprise generating, by the system, a first portion of the machine learning model to optimize the relocation of the data based on the performance data of the group of microservice applications. Further, the computer-implemented method can comprise generating, by the system, a second portion of the machine learning model to optimize the relocation of the data based further on the performance data of the at least one data center. An advantage of such a computer-implemented method can be.

According to an embodiment, a computer-implemented method is provided. The computer-implemented can comprise modifying, by a system operatively coupled to a processor, a data recovery scheme based on performance data exhibited by a network of data centers and a data recovery requirement. The data recovery scheme can direct a relocation of data within the network. An advantage of such a computer-implemented method can be enhanced network utilization during execution of the data recovery scheme.

In some examples, the modifying can be based on a first machine learning model and a second machine learning model to generate a modified data recovery scheme. Additionally, the computer-implemented method can comprise analyzing, by the system, the modified data recovery scheme to determine whether the modified data recovery scheme is predicted to improve the performance data and meet the data recovery requirement in comparison to the data recovery scheme. An advantage of such a computer-implemented method can leverage machine learning principals to continuously improve the efficiency of the method.

According to an embodiment, a computer program product for adaptively distributing data within a network of data centers is provided. The computer program product can comprise a computer readable storage medium having program instructions embodied therewith. The program instructions can be executable by a processor to cause the processor to modify, by the processor, a data recovery scheme based on performance data exhibited by a network of data centers and a data recovery requirement. The data recovery scheme can direct a relocation of data within the network. An advantage of such a computer program product can be that the data relocation scheme can be continuously analyzed and/or subject to adaptation based on changing performance characteristics measured in real-time or near real-time.

In some examples, the performance data can regard a group of microservice applications comprised within the data and at least one data center of the network. Further, the program instructions can further cause the processor to generate, by the processor, a first machine learning model to optimize the relocation of the data based on the group of microservice applications. Also, the program instructions can cause the processor to generate, by the processor, a second machine learning model to optimize the relocation of the data based further on the at least one data center. An advantage of such a computer program product can be the enablement of a data recovery system that can autonomously adjust to various changes in a given network of data centers.

DETAILED DESCRIPTION

Figure 1:
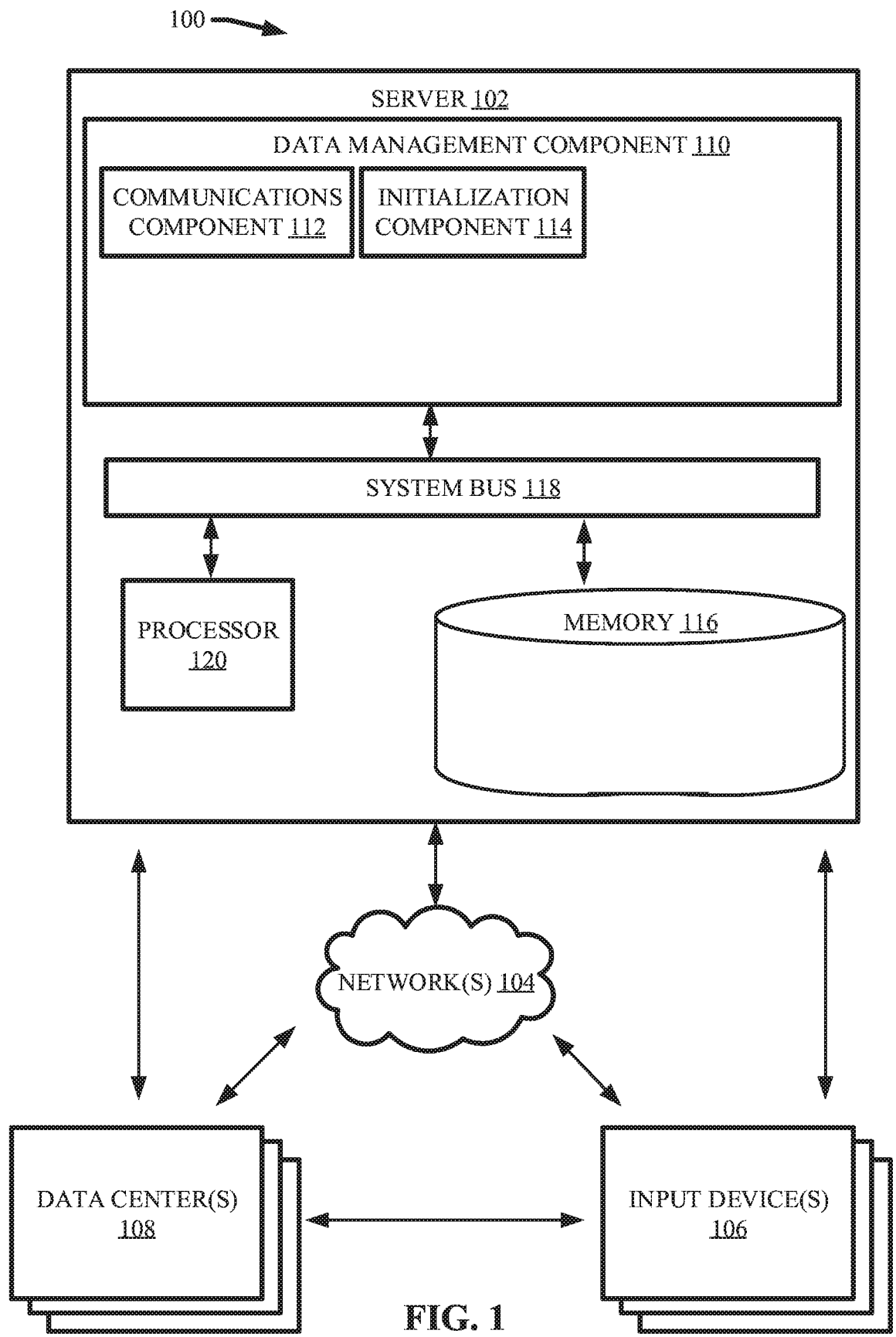
FIG. 1 illustrates a block diagram of an example, non-limiting system that can optimize one or more data recovery schemes within one or more networks of data centers in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with the conventional implementations of data recovery schemes; the present disclosure can be implemented to produce a solution to one or more of these problems by adapting a data recovery scheme based on historic performance data regarding previous execution of the data and/or characteristics of the data centers. Advantageously, one or more embodiments described herein can modify one or more initial data recovery schemes to optimize one or more defined data recovery requirements. For example, one or more embodiments can optimize one or more service level objectives ("SLOs") while meeting one or more user defined requirements.

Various embodiments of the present invention can be directed to computer processing systems, computer-implemented methods, apparatus and/or computer program products that facilitate the efficient, effective, and autonomous (e.g., without direct human guidance) adaptation of one or more data recovery schemes based on performance data exhibited by the given data and/or data centers in a given network. One or more embodiments can generate an adaptive data recovery scheme that can change over time depending upon established service level agreements ("SLAs") and/or experienced network utilization. For example, one or more embodiments can regard a system, computer-implemented method, and/or computer program product that can analyze performance data exhibited across a network of data centers and adapt a data recovery scheme based on the performance data to optimize, for instance: SLOs, recovery time objects ("RTOs"), and/or recovery point objectives ("RPOs").

The computer processing systems, computer-implemented methods, apparatus and/or computer program products employ hardware and/or software to solve problems that are highly technical in nature (e.g., generating and/or executing an adaptive data recovery scheme), that are not abstract and cannot be performed as a set of mental acts by a human. An individual, or a plurality of individuals, cannot readily monitor and analyze the voluminous amounts of data that can be managed by a data recovery scheme with the same speed and/or efficiency as the embodiments described herein. Further, the autonomous nature of one or more embodiments described herein can maintain the confidentiality of the data and/or the data disbursement.

FIG. 1 illustrates a block diagram of an example, non-limiting system 100 that can modify one or more data recovery schemes based on performance data exhibited by execution of the data and/or the one or more data centers of a given network. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, input devices 106, and/or data centers 108. The server 102 can comprise data management component 110. The data management component 110 can further comprise communications component 112 and/or initialization component 114. Also, the server 102 can comprise or otherwise be associated with at least one memory 116. The server 102 can further comprise a system bus 118 that can couple to various components such as, but not limited to, the data management component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or data centers 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the data management component 110 can be provided on the one or more servers 102, it should be appreciated that the architecture of system 100 is not so limited. For example, the data management component 110, or one or more components of data management component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the server 102 and/or data centers 108. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

A user of the system 100 can utilize the one or more input devices 106 and/or the one or more networks 104 to input one or more settings and/or commands into the system 100. For example, in the various embodiments described herein, a user of the system 100 can operate and/or manipulate the server 102 and/or associate components via the one or more input devices 106. Additionally, a user of the system 100 can utilize the one or more input devices 106 to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

The one or more data centers 108 can store, execute, share, and/or otherwise manipulate data managed by one or more data recovery schemes. For example, the one or more data centers 108 can comprise one or more computer servers that can be used to store, process, and/or distribute the given data. In various embodiments, the systems can comprise a plurality of data centers 108, including one or more primary data centers 108 and one or more secondary data centers 108. The one or more primary data centers 108 can be data centers 108 initially responsible for the storage, processing, and/or distribution of the given data. The one or more secondary data centers 108 can be data centers 108 targeted for relocation of the given data. Further, the plurality of data centers 108 can communicate with each other and/or share data via a direct electoral connection and/or the one or more networks 104.

In one or more embodiments, a user of the system 100 can designate one or more of the data centers 108 as primary data centers 108 via the one or more input devices 106. Likewise, the user can designate one or more of the data centers 108 as secondary data centers 108 via the one or more input devices 106. For example, the communications component 112 can receive one or more data center designations via a direct electrical connection with the one or more input devices 106 and/or via the one or more networks 104 and/or can share the designations with the associate components of the data management component 110. The data management component 110 can thereby generate an initial data recovery scheme based on the user defined designations. For instance, the data management component 110 can generate a data recovery scheme delineating the replication and/or relocation of data from one or more data centers 108 designated by the user as primary to one or more data centers 108 designated by the user as secondary. Further, a user of the system 100 can utilize the one or more input devices 106 to define one or more SLAs, SLOs. IPOs, and/or RTOs to be considered by the data management component 110 when generating the initial data recovery scheme.

In some embodiments, a user of the system 100 can provide the data management component 110 with the initial data recovery scheme via the one or more input devices 106 (e.g., via the communications component 112 and/or the one or more networks 104). In various embodiments, a user of the system 100 can utilize the one or more input devices 106 to designate one or more data centers 108 as primary data centers 108 and input one or more data recovery requirements. Thereupon, the initialization component 114 can autonomously designate one or more other data centers 108 as secondary data centers 108 to facilitate the data management component 110 in generating an initial data recovery scheme.

For example, the initialization component 114 can assess the data centers 108 accessible via the one or more networks 104 to generate a list of available data center 108 pairs, wherein each data center 108 pair can comprise the one or more designated primary data centers 108 associated with one or more available other data centers 108 (e.g., thereby designated as available secondary data centers 108). Next, the initialization component 114 can remove data center 108 pairs from the availability list based on one or more data recovery requirements defined by a user of the system 100. For instance, the initialization component 114 can remove data centers 108 as potentially available secondary data centers 108 based on the given data centers 108 being a part of the same facility and/or infrastructure as the primary data center 108. By designating secondary data centers 108 that are separate from the facility and/or infrastructure of the primary data center 108, the data management component 110 can generate a data recovery scheme that can facilitate data recovery in the event that the facility and/or infrastructure of the primary data center 108 is compromised.

In another instance, the initialization component 114 can remove data centers 108 as potentially available secondary data centers 108 based on the given data centers 108 being located in an unacceptable geography (e.g., as defined by the user of the system 100). For example, a user of the system 100 can define a geographical boundary in Which any data relocation is confined (e.g., data relocation can be confined to a particular municipality, country, region, and/or country), whereupon data centers 108 located outside the geographical boundary, can be removed as candidates for secondary data center 108 designation. Thereby, the initialization component 114 can remove secondary data center 108 candidates that conflict with one or more user defined data recovery requirements to facilitate user needs and/or compliance with one or more governing regulations.

In one or more embodiments, the initialization component 114 can further remove data centers 108 as potentially available data centers 108 based on the performance capacities of the given data centers 108 and one or more target performance objectives of the data recovery scheme. For example, the initialization component 114 can remove secondary data center 108 candidates that are likely to fail one or more latency SLOs during execution of the data recovery scheme. In various embodiments, the initialization component 114 can sort the remaining secondary data center 108 candidates based on bandwidth (e.g., average available bandwidth of the data centers 108). Thereby, the initialization component 114 can generate a list of available data centers 108 that can be designated as secondary data centers 108 to the one or more given primary data centers 108 to facilitate generation of an initial data recovery scheme. For instance, the data management component 110 can analyze the list of available data centers 108 and designate one or more of the data centers 108 as secondary data centers 108 in generating the one or more initial data recovery schemes.

Figure 2:
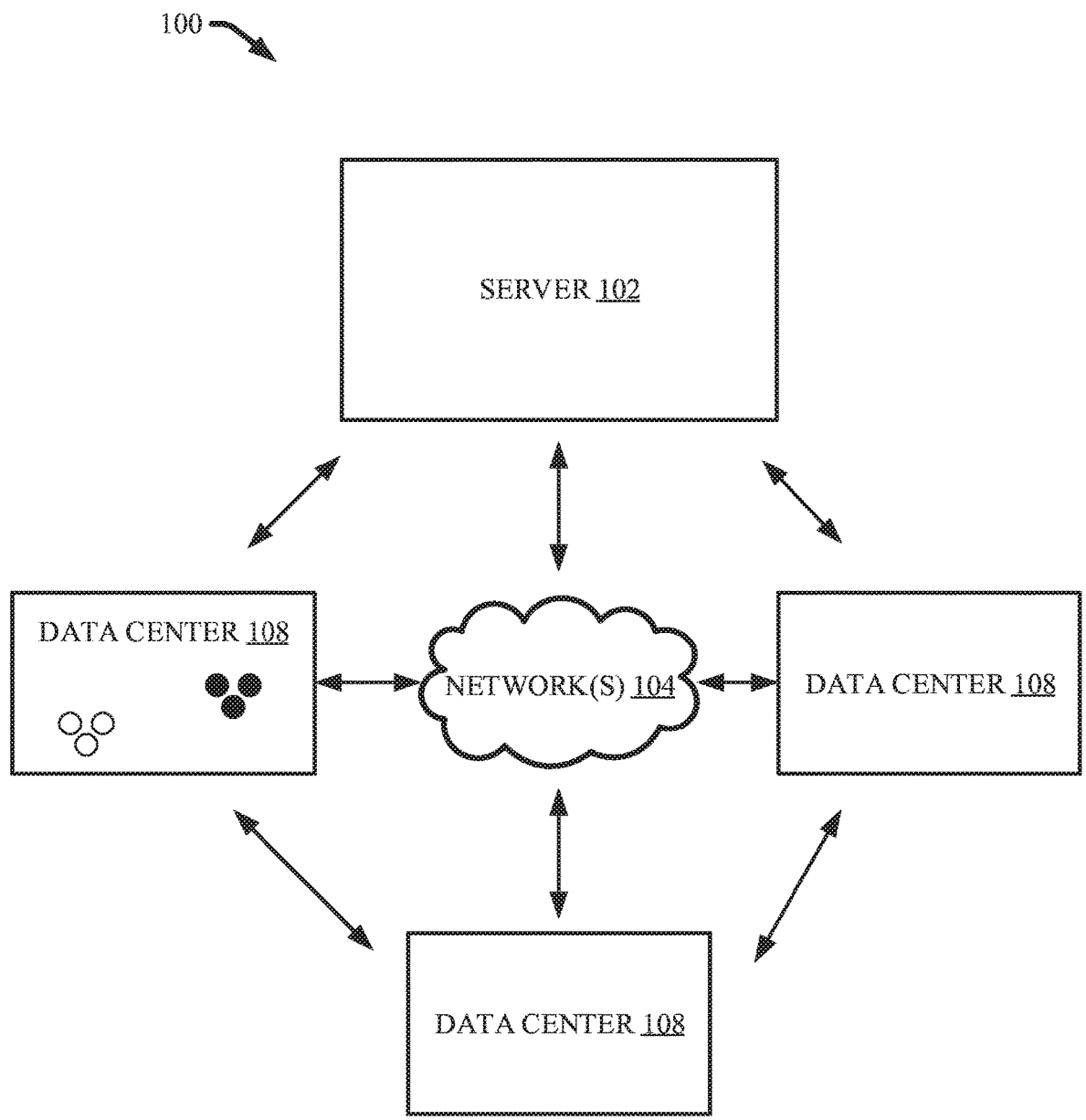
FIG. 2 illustrates a block diagram of an example, non-limiting data center network that can facilitate the relocation of data from one or more primary data centers to one or more secondary data centers in accordance with one or more embodiments described herein.

FIG. 2 illustrates a diagram of the example, non-limiting system 100 comprising three data centers 108 in accordance with one or more embodiments described herein. Repetitive description of like dements employed in other embodiments described herein is omitted for sake of brevity. Although FIG. 2 illustrates three data centers 108, the architecture of the system 100 is not so limited. For example, embodiments comprising less than or greater than three data centers 108 are also envisaged.

As shown in FIG. 2, the data centers 108 can communicate with each other and/or the server 102 via one or more direct electrical connections and/or the one or more networks 104. In FIG. 2, the data subject to management by the one or more data recovery schemes is illustrated by a plurality of circles. In one or more embodiments, the data can comprise one or more microservices. Further, the one or more microservices can be arranged into groups based upon the functionality and/or requirements of the microservices. In various embodiments, microservices of the same group can be relocated together via the data recovery scheme. For example, FIG. 2 illustrates two groups of microservices, wherein a first group of microservices is represented by white circles while a second group of microservices is represented by black circles. Additionally, each group of microservices can be associated with one or more respective databases to facilitate their functionality. The one or more groups of microservices can be initially stored, processed, and/or executed on a primary data center 108. For example, FIG. 2 illustrates the system 100 prior to execution of a data recovery scheme, wherein the left data center 108 is designated as a primary data center 108 (e.g., thereby comprising the two group of microservices), whereas the bottom and right data centers 108 are designated as secondary data centers 108.

In various embodiments, the data management component 110 (e.g., via the communications component 112 and/or the initialization component 114) can collect performance data regarding the data (e.g., the one or more microservices), the one or more data centers 108, and/or one or more data recovery requirements (e.g., as defined by a user of the system 100 and/or one or more SLAs). The performance data regarding the one or more data centers 108 can describe, for example but not limited to: location of the data centers 108 (e.g., address, municipality, region, country, continent, and/or territory of the given data center 108), work group designations (e.g., one or more organizations affiliated with the given data center 108), the maximum assigned bandwidth between one or more data centers 108, the average network latency between one or more data centers 108, operational capacities and/or features of a given data center 108, distance between data centers 108, fixed and/or recurring costs of supporting a given data center 108, a combination thereof, and/or the like. The performance data regarding the data (e.g., the one or more microservice groups) can describe, for example but not limited to: target application latency (e.g., maximum time to relocate the data, and/or deliver a data update, to the designated secondary data center 108), a collocation group designation (e.g., one or more requirements describing the target secondary data center 108), an anti-collocation group (e.g., one or more requirements that can be used to filter potential secondary data center 108 candidates), average used bandwidth (e.g., total used bandwidth measured across the databases a given microservice group over a defined period, such as a day), average application latency (e.g., maximum latency measured across the databases of a given microservice group), a combination thereof, and/or the like. In various embodiments, the performance data regarding the one or more data centers 108 and/or the data can be measured and/or updated periodically to capture recent performance history.

Figure 3:
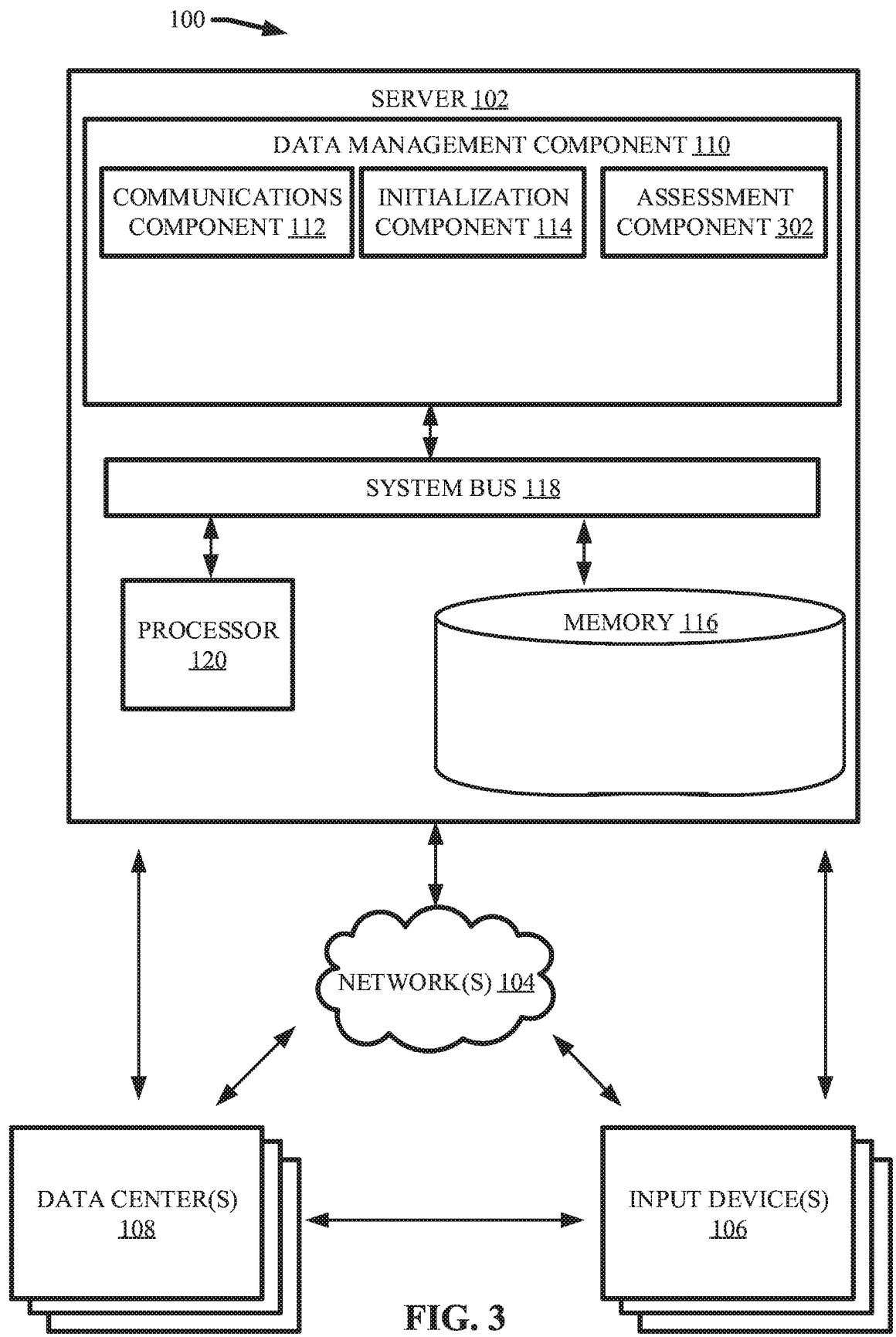
FIG. 3 illustrates a block diagram of an example, non-limiting system that can assess one or more data recovery schemes to determine whether one or more data recovery requirements are met in accordance with one or more embodiments described herein.

FIG. 3 illustrates a diagram of the example, non-limiting system 100 further comprising assessment component 302 in accordance with one or more embodiments described herein. Repetitive description of like elements employed in other embodiments described herein is omitted for sake of brevity. In one or more embodiments, the assessment component 302 can analyze one or more data recovery schemes to determine whether the given data recovery schemes are predicted to achieve one or more target performance objectives. For example, the assessment component 302 can analyze the one or more initial data recovery schemes to generate one or more baseline metrics that can be utilized to determine whether future modifications to the data recovery scheme achieve a performance improvement.

In one or more embodiments, the assessment component 302 can analyze the one or more initial data recovery schemes and set initial conditions for each data center 108 pair (e.g., pair of a primary data center 108 and a secondary data center 108) designated by the data recovery scheme. For example, the assessment component 302 can reset an assessment counter regarding the estimated used bandwidth between the given data centers 108 ƒ the pair to a value of zero. Next, the assessment component 302 can update the used bandwidth for the given data center 108 pair for each of the managed microservice groups. For example, the assessment component 302 can increase the estimated used bandwidth by the value of the average used bandwidth (e.g., the total bandwidth used by the databases of the given microservice group). Subsequently, the assessment component 302 can count the amount of microservice groups that fail to meet one or more SLO targets. For example, the assessment component 302 can count a missed SLO target if the average application latency of the given microservice group is greater than the target application latency (e.g., if the measured application latency is higher than the target SLO). Further, the assessment component 302 can identify high traffic areas between designated data centers 108. For example, the assessment component 302 can calculate a used bandwidth ration as the estimated used bandwidth divided by the maximum assigned bandwidth (e.g., the percentage of a given bandwidth used between the given data centers 108). Additionally, the assessment component 302 can determine one or more assessment values based on the functions described above. For example, the assessment component 302 can calculate a ratio of missed SLOs as a percentage of the microservice groups that miss the one or more SLO targets. In another example, the assessment component 302 can calculate an average used bandwidth ratio as a squared deviation from an average of the used bandwidth ratio (e.g., which can describe the distribution of bandwidth for the one or more data center 108 pairs managed by the given data recovery scheme).

Figure 4:
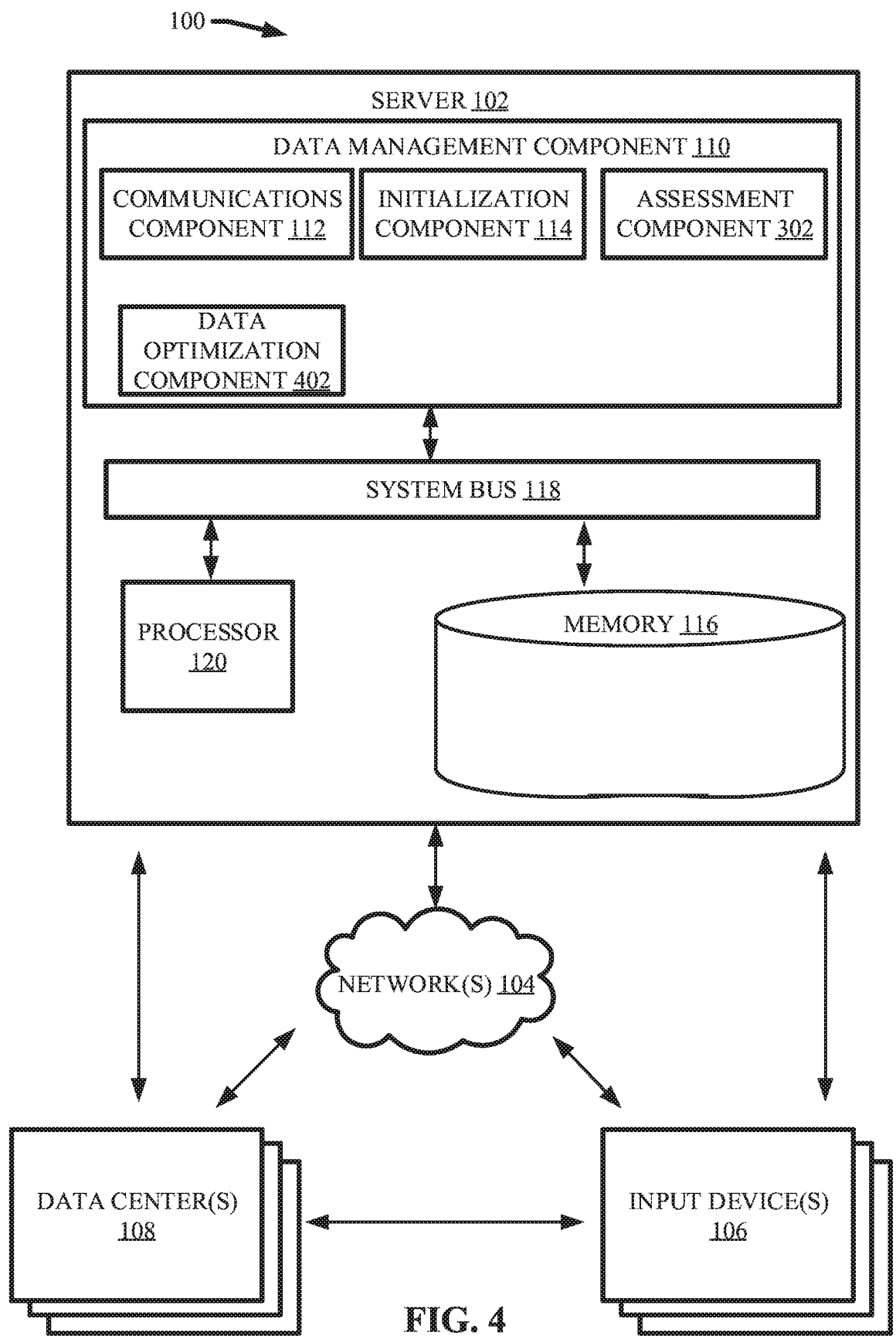
FIG. 4 illustrates a block diagram of an example, non-limiting system that can modify one or more data recovery schemes based on performance data regarding one or more groups of microservices comprised within the data in accordance with one or more embodiments described here.

FIG. 4 illustrates a diagram of the example, non-limiting system 100 further comprising data optimization component 402 in accordance with one or more embodiments described herein. Repetitive description of like elements employed in other embodiments described herein is omitted for sake of brevity. In various embodiments, the data optimization component 402 can generate one or more machine learning models to optimize the relocation of the data (e.g., the microservice groups), wherein the machine learning model can identify one or more relationships between one or more modifications to the initial data recovery scheme and the one or more data recovery requirements based on the performance data for the one or more groups of microservices.

In one or more embodiments, the data optimization component 402 can identify one or more modifications to the initial data recovery scheme that can be implemented by the data management component 110 to generate a modified data recovery scheme. Thereupon, the assessment component 302 can assess the modified data recovery scheme to calculate one or more assessment values that can be compare to the assessment values of the initial data recovery scheme to determine whether the modifications improve the efficiency of the data recovery scheme. Further, the identification of potential modifications, and the assessment of modified data recovery schemes can be performed by the data optimization component 402 and/or the assessment component 302 in an iterative manner to optimize the given data recovery scheme by the data management component 110.

For example, in various embodiments the data optimization component 402 can begin an optimization iteration by duplicating the data recovery scheme subject to analysis (e.g., the initial data recovery scheme), so as to isolate the machine learning model in the event that the identified modifications fail to increase the efficacy of the data recovery scheme. Thereupon, the data optimization component 402 can begin generating the one or more machine learning models by filtering the microservice groups where the average application latency is greater than a defined threshold (e.g., user defined threshold) of the target application latency. For example, wherein the defined threshold is 90% of the target application latency, the data optimization component 402 can filter microservice groups of the given data recovery scheme having an average application latency greater than 90% of the target application latency.

In one or more embodiments, the data optimization component 402 can farther sort the microservice groups according to a ratio of the average application latency over the target application latency. For example, the data optimization component 402 can sort the microservice groups according to those failing the one or more SLO targets, followed by microservice groups at risk for failing the one or more SLO targets. Additionally, the data optimization component 402 can determine one or more modification that can direct new relocation destinations (e.g., alternate secondary data centers 108) for microservice groups identified as failing, or at risk of failing the one or more SLO targets. For example, the data optimization component 402 can generate and/or analyze a list of available secondary data center 108 candidates for a given primary data center and microservice group. Further, the data optimization component 402 can remove secondary data center 108 candidates based on the location information associated with the given data centers 108, the collocation group designations, and/or the anti-collocation group information. For example, the list of secondary data center 108 candidates can be narrowed to only include those within a define geographical boundary. In addition, the data optimization component 402 can remove secondary data center 108 candidates in which the resulting pairing with the primary data center 108 would result in a latency that fails to meet the one or more SLO target. For example, the data optimization component 402 can remove secondary data center 108 candidates in which the target application latency is less than the average network latency multiplied by a latency correction, wherein the latency correction can be calculated as the average application latency over the average network latency on give data center 108 pairing (e.g., the latency correction can be a correct for a difference between network and application latency).

Additionally, the data optimization component 402 can remove secondary data center 108 candidates in which the estimated application latency would be worse than the existing application latency. For example, the data optimization component 402 can remove secondary data center 108 candidates wherein the given average application latency is less than the average network latency times the latency correction. Further, the data optimization component 402 can sort the remaining secondary data center 108 candidates based on the used bandwidth ratio. For example, the data optimization component 402 can sort the remaining secondary data center 108 candidates to achieve a desired application latency while minimizing the network load.

Thereby, the data optimization component 402 can adjust the given data recovery scheme by changing the one or more target secondary data centers 108 based on the resulting list of secondary data center 108 candidates. For example, the data optimization component 402 can remove the original target secondary data center 108 destination from the machine learning model (e.g., for the original data center 108 pairing, the data optimization component 402 can decrease the value of the estimated used bandwidth by the amount of average used bandwidth). Thereby, the data optimization component 402 can determine a relocation of the given microservice group to a new secondary data center 108 from the assorted secondary data center 108 candidates and/or adjust the corresponding application latency to the average network latency times the latency correction value.

Further, the data management component 110 can implement the new data center 108 pairing (e.g., the given primary data center 108 paired with the newly identified alternate secondary data center 108) and can increase the value of the corresponding estimated used bandwidth by the amount of the measured average used bandwidth. Thereby, the data management component 110 can generate one or more modified data recovery schemes. Moreover, the assessment component 302 can analyze the one or more modified data recovery schemes to determine of more assessment values. Additionally, the assessment component 302 can compare the assessment values of the one or more modified data recovery schemes to the assessment values of the one or more previous versions of the data recovery schemes (e.g., the one or more initial data recovery schemes) to determine whether the one or more modifications determined by the data optimization component 402 improve the assessment values (e.g., determine whether the modifications determined by the data optimization component 402 cause the ratio of missed SLO targets and/or the average used bandwidth ratio to decrease.

In the event that the given modifications improve the assessment values, the data management component 110 can keep and/or utilize the subsequent modified data recovery scheme. In the event that the given modifications do not improve the assessment values, the data management component 110 can roll back the modifications and the data optimization component 402 can identify one or more new modifications utilizing other secondary data centers 108 from the assortment of newly identified alternate secondary data centers 108 (e.g., whereupon the new modifications can be likewise analyzed by the assessment component 302 in a further iteration of the optimization process).

Figure 5:
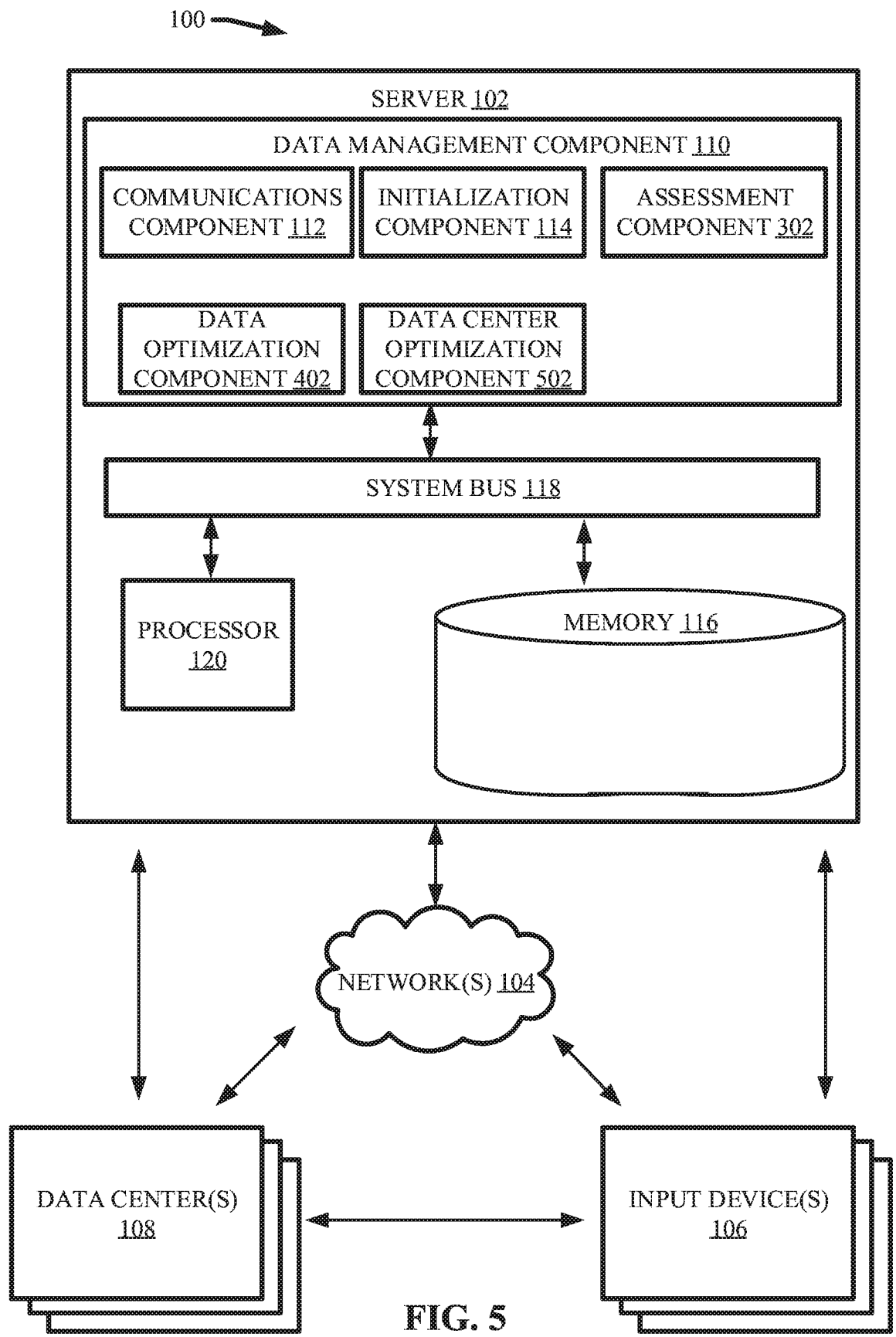
FIG. 5 illustrates a block diagram of an example, non-limiting system that can modify one or more data recovery schemes based on performance data regarding one or more data centers comprised within a data center network managed by a given data recovery scheme in accordance with one or more embodiments described herein.

FIG. 5 illustrates a diagram of the example, non-limiting system 100 further comprising data center optimization component 502 in accordance with one or more embodiments described herein. Repetitive description of like elements employed in other embodiments described herein is omitted for sake of brevity. In various embodiments, the data center optimization component 502 can generate one or more machine learning models to optimize the relocation of the data via the data recovery scheme based further on the performance data of the data centers 108, wherein the machine learning models can identify one or more relationships between modifications to a data recovery scheme (e.g., an initial data recovery scheme and the one or more data recovery requirements based on the performance data of the one or more data centers 108. In one or more embodiments, the data center optimization component 502 can further contribute to the one or more machine learning models generated by the data optimization component 402.

In one or more embodiments, the data center optimization component 502 can identify highly trafficked data centers 108 and/or account for the traffic in the one or more machine learning models (e.g., generated by the data optimization component 402) in determining one or more modifications to a data recovery scheme that can improve one or more assessment values. For instance, the data center optimization component 502 can further filter the secondary data center 108 candidates to remove data centers 108 in which the used bandwidth ratio is greater than the average used bandwidth ratio. Additionally, the data center optimization component 502 can further sort the secondary data center 108 candidates based on the used bandwidth ratio. Also, the data center optimization component 502 can sort microservice groups based on the average application latency.

Thereby, the data center optimization component 502 can further contribute to identifying modifications to the given data recovery scheme based on the list of secondary data center 108 candidates that is further narrowed based on the data traffic experienced at the data centers 108 and/or the application latency experience by the one or more microservice groups. For example, the data optimization component 402 can remove highly trafficked data center 108 destinations from the machine learning model, such that a single secondary data center 108 is not paired with an overwhelming number of primary data centers 108 and/or microservice groups. Thereby, the data center optimization component 502 can further refine identification of the one or more modifications generated by the data optimization component 402 to ascertain modifications to the given data recovery scheme that can improve the assessment values. As described herein, the assessment component 302 can analyze any of the modifications identified by the data optimization component 402 and/or data center optimization component 502 to ascertain whether the given modifications can improve the assessment values of the data recovery scheme as compared to previous versions of the given data recovery scheme.

Figure 6:
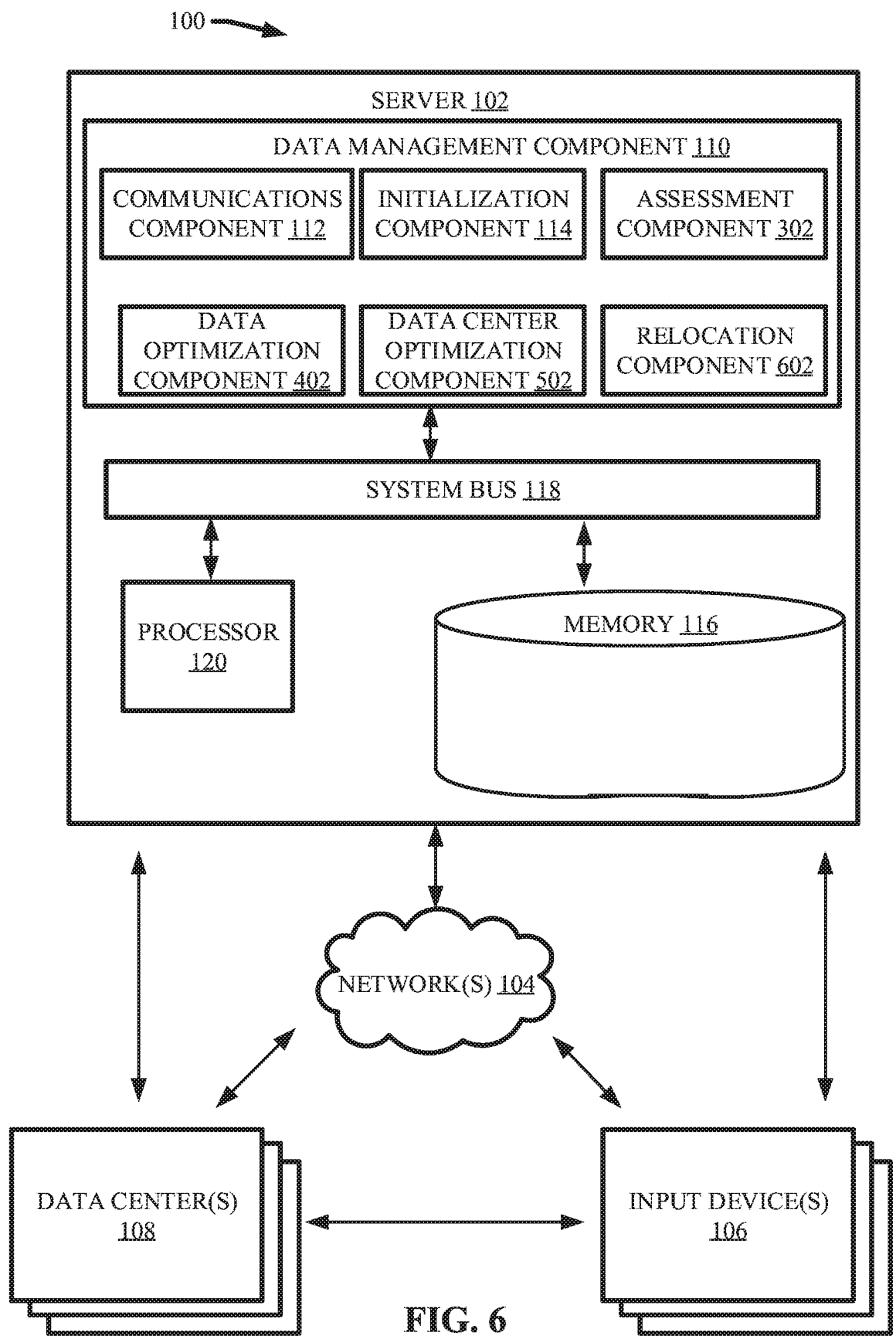
FIG. 6 illustrates a block diagram of an example, non-limiting system that can relocate data amongst one or more data center networks in correlation with one or more modified data recovery schemes in accordance with one or more embodiments described herein.

FIG. 6 illustrates a diagram of the example, non-limiting system 100 further comprising relocation component 602 in accordance with one or more embodiments described herein. Repetitive description of like elements employed in other embodiments described herein is omitted for sake of brevity. In various embodiments, the relocation component 602 can execute the one or more modified data recovery schemes in response to the assessment component 302 determining that the modification identified by the data optimization component 402 and/or the data center optimization component 502 can improve the efficiency of the previously established data recovery scheme. For example, the relocation component 602 can replicate and/or transfer one or more microservice groups from the primary data center 108 to the one or more target secondary data centers 108 in accordance with the modified data recovery scheme. Further, in one or more embodiments the relocation component 602 can remove the data from the one or more primary data centers 108.

Figure 7:
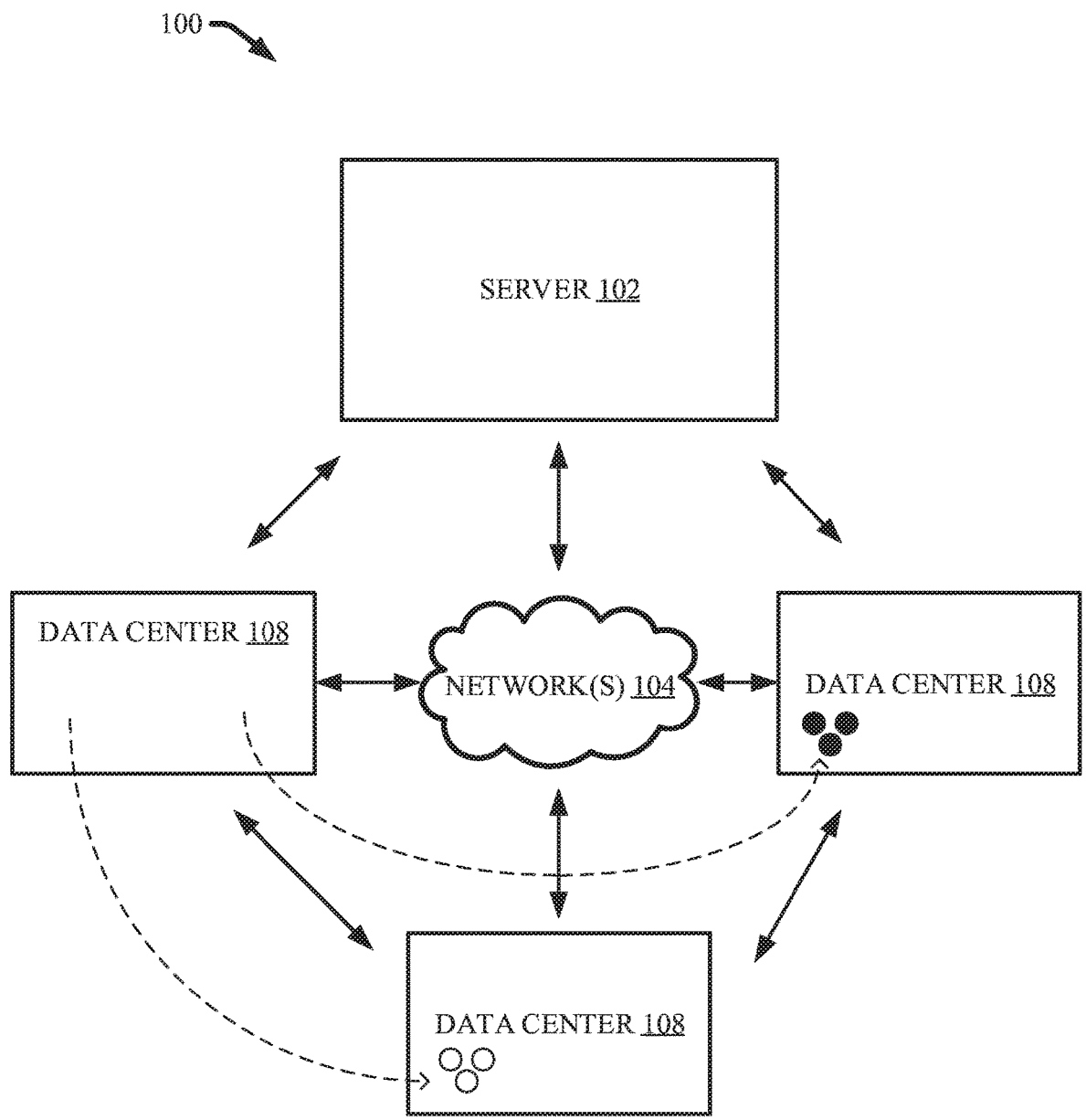
FIG. 7 illustrates a diagram of an example, non-limiting data center network that can facilitate the relocation of data from one or more primary data centers to one or more secondary data centers, as directed by one or more data recovery schemes in accordance with one or more embodiments described herein.

FIG. 7 illustrates a diagram of the example, non-limiting system 100 comprising data relocated by the relocation component 602 in accordance with one or more embodiments described herein. Repetitive description of like dements employed in other embodiments described herein is omitted for sake of brevity. For example, FIG. 7 illustrates the system 100 of FIG. 2 subsequent to the execution of a modified data recovery scheme by the relocation component 602. As shown in FIG. 7, the first microservice group can be relocated to the bottom secondary data center 108, while the second micro service group can be relocated to the right secondary data center 108 (e.g., as delineated by the dashed arrows shown in FIG. 7). In various embodiments, the first microservice group can be paired to the bottom secondary data center 108 and the second microservice group can be paired to the right secondary data center 108 based on the one or more machine learning models developed by the data optimization component 402 and/or the data center optimization component 502. Thereby, the data recovery scheme executed by the relocation component 602 can direct the relocation of data to secondary data centers 108 based on performance data (e.g., regarding the microservice groups and/or data centers 108) recently and/or historically exhibited and measured.

Figure 8:
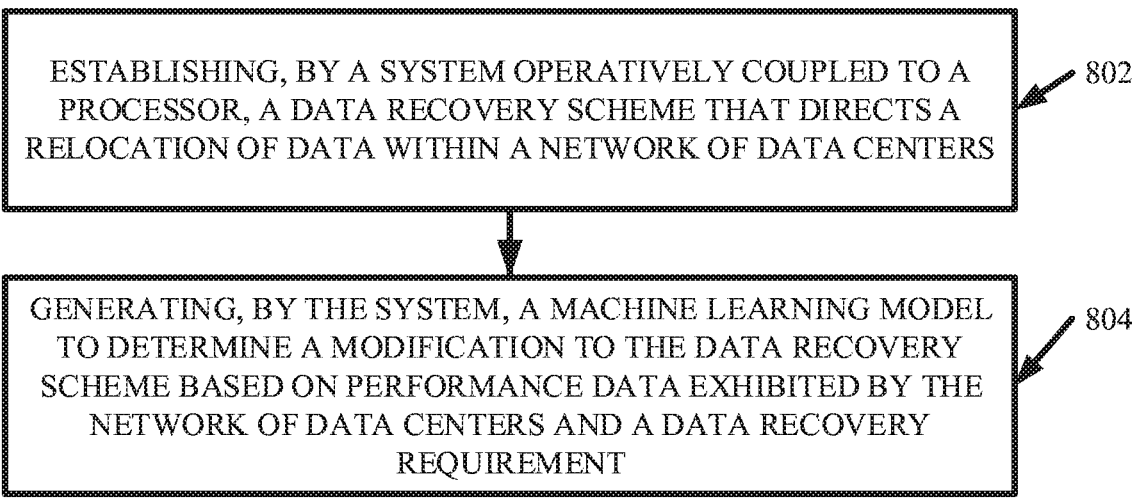
FIG. 8 illustrates a flow diagram of an example, non-limiting method that can facilitate modifying one or more data recovery schemes to enhance relocation efficiency based on performance data and/or data recovery requirements associated with the subject data and/or one or more data center networks in accordance with one or more embodiments described herein.

FIG. 8 illustrates a flow diagram of an example, non-limiting method 800 that can facilitate generating one or more modifications a data recovery scheme in accordance with one or more embodiments described herein. Repetitive description of like elements employed in other embodiments described herein is omitted for sake of brevity.

At 802, the method 800 can comprise establishing (e.g., via communications component 112 and/or initialization component 114), by a system 100 operatively coupled to a processor 120, one or more data recovery schemes that can direct a relocation of data within a network 104 of data centers 108. For example, the one or more data recovery schemes can be entered into the system 100 by one or more users via one or more input devices 106. In various embodiments, the one or more data recovery schemes can be initially generated by the system 100 (e.g., via the initialization component 114) based on one or more designated primary data centers 108, performance data of the given data and/or data centers 108 of the network 104, and/or user defined data recovery requirements. The one or more data recovery schemes can describe the duplication and/or transference of data from one or more primary data centers 108 to one or more secondary data centers 108, as described herein.

At 804, the method 800 can comprise generating (e.g., via the data optimization component 402 and/or data center optimization component 502), by the system 100, one or more machine learning models to determine one or more modifications to the one or more data recovery schemes of 802 based on performance data exhibited by the network 104 of data centers 108 and/or one or more data recovery requirements. For example, the one or more modifications can be changes to the secondary data center 108 destinations paired with the one or more primary data centers 108 and/or microservice groups comprised within the data. The one or more machine learning models can identify the modifications based on measured performance data that characterizes past operation of the microservice groups and/or past operation of the one or more data centers 108 to achieve SLA targets and/or enhance network 104 utilization, in accordance with various embodiments described herein. For example, the one or more modifications can regard alterations to data center 108 pairings that have exhibited performance data that does not meet one or more target SLOB; thereby, the modifications can attempt to reduce the number of missed SLO targets exhibited during execution of the data recovery scheme. In another example, the one or more modifications can regard alterations to data center 108 pairings that rely on heavily trafficked secondary data centers 108; thereby, the modifications can attempt to enhance network 104 utilization.

Figure 9:
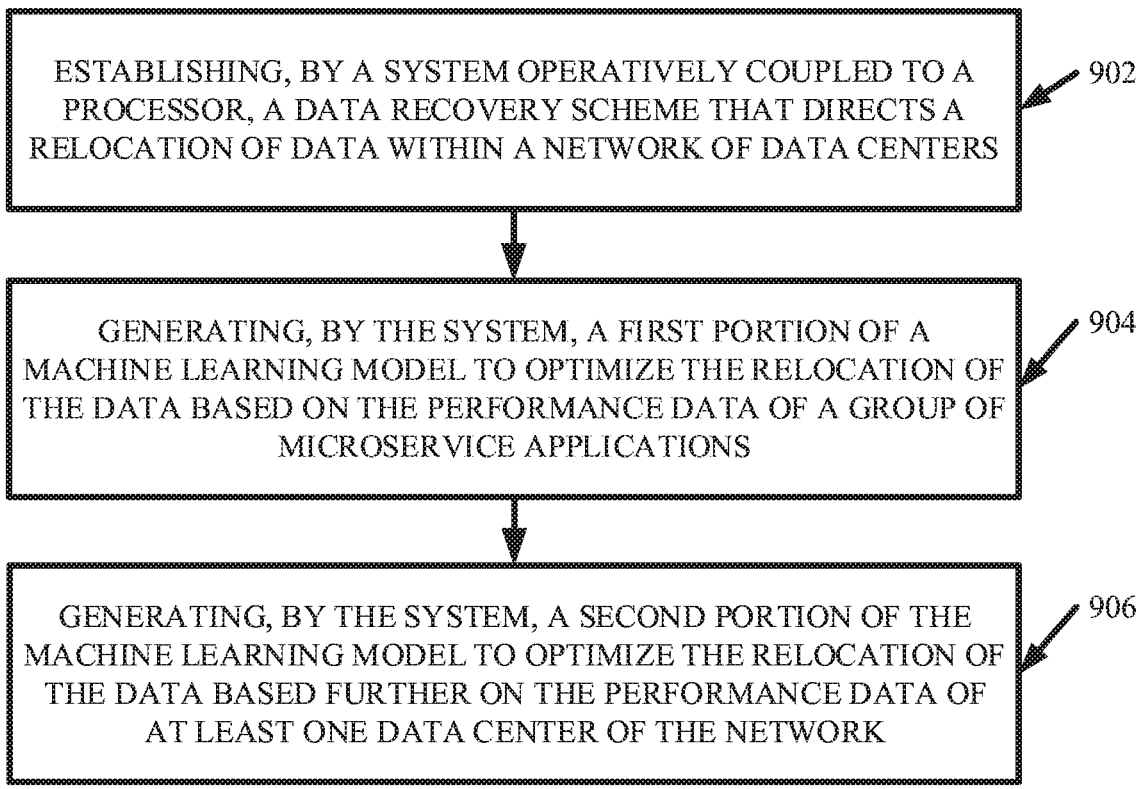
FIG. 9 illustrates a flow diagram of an example, non-limiting method that can facilitate modifying one or more data recovery schemes to enhance relocation efficiency based on performance data and/or data recovery requirements associated with the subject data and/or one or more data center networks in accordance with one or more embodiments described herein.

FIG. 9 illustrates a flow diagram of an example, non-limiting method 900 that can facilitate generating one or more modifications a data recovery scheme in accordance with one or more embodiments described herein. Repetitive description of like elements employed in other embodiments described herein is omitted for sake of brevity.

At 902, the method 900 can comprise establishing (e.g., via communications component 112 and/or initialization component 114), by a system 100 operatively coupled to a processor 120, one or more data recovery schemes that can direct a relocation of data within a network 104 of data centers 108. For example, the one or more data recovery schemes can be entered into the system 100 by one or more users via one or more input devices 106. In various embodiments, the one or more data recovery schemes can be initially generated by the system 100 (e.g., via the initialization component 114) based on one or more designated primary data centers 108, performance data of the given data and/or data centers 108 of the network 104, and/or user defined data recovery requirements. The one or more data recovery schemes can describe the duplication and/or transference of data from one or more primary data centers 108 to one or more secondary data centers 108, as described herein.

At 904, the method 900 can comprise generating (e.g., via data optimization component 402), by the system 100, one or more first portions of one or more machine learning models to optimize the relocation of the data based on the performance data of one or more groups of microservice applications. For example, the machine learning model can determine one or more modifications to the data recovery scheme that can increase the number of SLA targets achieved during relocation of the data. Further, the machine learning model can be developed based on performance data regarding the past operation of one or more microservice groups comprised within the data subject to management by the data recovery scheme. For instance, the one or more machine learning models can identify one or more other secondary data centers 108 than the secondary data centers 108 designated in the data recovery scheme as alternate destinations for relocation of one or more of the microservice groups.

At 906, the method 900 can comprise generating (e.g., via data center optimization component 502), by the system 100, one or more second portions of the one or more machine learning models to optimize the relocation of the data based further on the performance data of at least one data center 108 operably coupled to the network 104. For example, the machine learning model can further refine the determination of the one or more modifications to the data recovery scheme so as to improve network 104 utilization. For instance, the one or more machine learning models can identify one or more secondary data centers 104 that have exhibited a large amount of data traffic; thereby enabling the system 100 (e.g., via data management component 110) to modify the data recovery scheme to pair the given primary data centers 108 with underutilized secondary data centers 108 so as to meet SLO targets while also utilizing the network 104 of data centers 108 in a more efficient manner.

Figure 10:
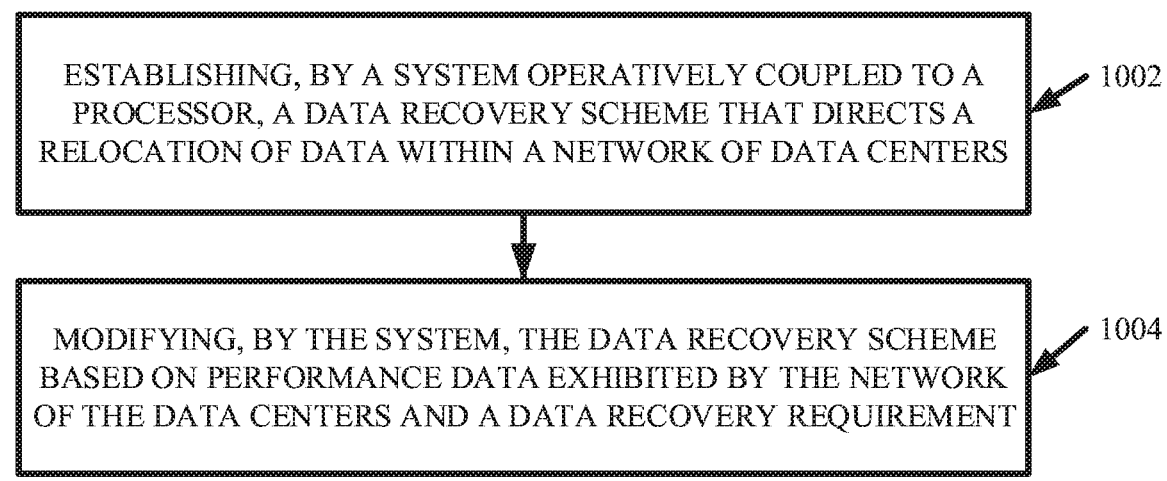
FIG. 10 illustrates a flow diagram of an example, non-limiting method that can facilitate modifying one or more data recovery schemes to enhance relocation efficiency based on performance data and/or data recovery requirements associated with the subject data and/or one or more data center networks in accordance with one or more embodiments described herein.

FIG. 10 illustrates a flow diagram of an example, non-limiting method 1000 that can facilitate generating one or more modifications a data recovery scheme in accordance with one or more embodiments described herein. Repetitive description of like elements employed in other embodiments described herein is omitted for sake of brevity.

At 1002, the method 1000 can comprise establishing (e.g., via communications component 112 and/or initialization component 114), by a system 100 operatively coupled to a processor 120, one or more data recovery schemes that can direct a relocation of data within a network 104 of data centers 108. For example, the one or more data recovery schemes can be entered into the system 100 by one or more users via one or more input devices 106. In various embodiments; the one or more data recovery schemes can be initially generated by the system 100 (e.g., via the initialization component 114) based on one or more designated primary data centers 108, performance data of the given data and/or data centers 108 of the network 104, and/or user defined data recovery requirements. The one or more data recovery schemes can describe the duplication and/or transference of data from one or more primary data centers 108 to one or more secondary data centers 108, as described herein.

At 1004, the method 1000 can comprise modifying (e.g., via the data optimization component 402, data center optimization component 502, and/or assessment component 302), by the system 100, the one or more data recovery schemes based on performance data exhibited by the network 104 of data centers 108 and one or more data recovery requirements. For example, the method 1000 can comprise generating one or more machine learning models that can identify one or more modifications to the data recovery schemes that can increase the achievement of SLO targets and/or network 104 utilization. Further, in various embodiments, the method 1000 can comprise assessing the one or more identified modifications to determine whether implementation of the given modifications is predicted to actualize the intended enhancements. Moreover, the given modifications can be based on measured performance data regarding the given data (e.g., average used bandwidth, average application latency, target application latency, collocation group, and/or anti-collocation group) and/or one or more of the data centers 108 (e.g., geographical and/or affiliate assignments, maximum assigned bandwidth, and/or average network latency). Thereby, the method 1000 can adapt the one or more data recovery schemes based on the operation of the data and/or data centers 108 in order to enhance the efficiency of the data recovery schemes while meeting one or more data recovery requirements (e.g., one or more target SLOs, target application latency, and/or target data center 108 locations).

Figure 11:
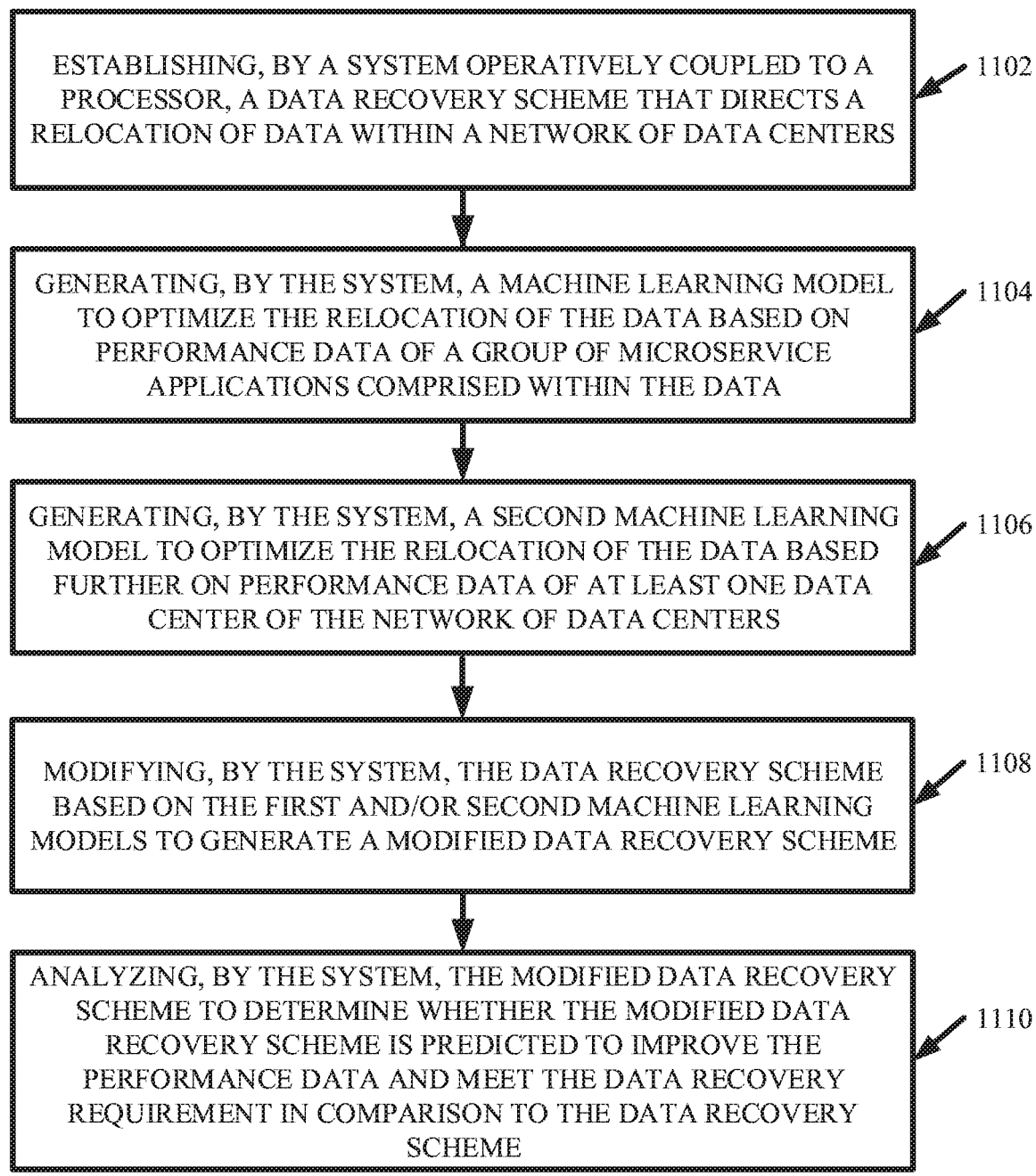
FIG. 11 illustrates a flow diagram of an example, non-limiting method that can facilitate modifying one or more data recovery schemes to enhance relocation efficiency based on performance data and/or data recovery requirements associated with the subject data and/or one or more data center networks in accordance with one or more embodiments described herein.

FIG. 11 illustrates a flow diagram of an example, non-limiting method 1100 that can facilitate generating one or more modifications a data recovery scheme in accordance with one or more embodiments described herein. Repetitive description of like elements employed in other embodiments described herein is omitted for sake of brevity.

At 1102, the method 1100 can comprise establishing (e.g., via communications component 112 and/or initialization component 114), by a system 100 operatively coupled to a processor 120, one or more data recovery schemes that can direct a relocation of data within a network 104 of data centers 108. For example, the one or more data recovery schemes can be entered into the system 100 by one or more users via one or more input devices 106. In various embodiments, the one or more data recovery schemes can be initially generated by the system 100 (e.g., via the initialization component 114) based on one or more designated primary data centers 108, performance data of the given data and/or data centers 108 of the network 104, and/or user defined data recovery requirements. The one or more data recovery schemes can describe the duplication and/or transference of data from one or more primary data centers 108 to one or more secondary data centers 108, as described herein.

At 1104, the method 1100 can comprise generating (e.g., via data optimization component 402), by the system 100, one or more machine learning models to optimize the relocation of the data based on performance data of one or more groups of microservice applications comprised within the data. For example, the machine learning model can determine one or more modifications to the data recovery scheme that can increase the number of SLA targets achieved during relocation of the data. Further, the machine learning model can be developed based on performance data regarding the past operation of one or more microservice groups (e.g., average used bandwidth, average application latency, target application latency, collocation group, and/or anti-collocation group). For instance, the one or more machine learning models can identify one or more other secondary data centers 108 than the secondary data centers 108 designated in the data recovery scheme as alternate destinations for relocation of the one or more of the microservice groups. In various embodiments, the one or more machine learning models can identify alternate secondary data centers 108 to pair with one or more given primary data centers 108 based on measured performance data of past operations of the one or more microservice groups. Further, the one or more machine learning models can prioritize adjustments to data relocations determined to achieve less than a threshold amount of SLO targets.

At 1106, the method 1100 can comprise generating (e.g., via data center optimization component 502), by the system 100, one or more second machine learning models to optimize the relocation of the data based further on the performance data of at least one data center 108 of the network 104 of data centers 108. For example, the one or more second machine learning models can further refine the determination of the one or more modifications to the data recovery scheme so as to improve network 104 utilization. For instance, the one or more machine learning models can identify one or more secondary data centers 104 that have exhibited a large amount of data traffic; thereby enabling the system 100 (e.g., via data management component 110) to modify the data recovery scheme to pair the given primary data centers 108 with underutilized secondary data centers 108 so as to meet SLO targets while also utilizing the network 104 of data centers 108 in a more efficient manner. In various embodiments, the one or more second machine learning models can further analyze the average amount of bandwidth used by the given data centers 108 and/or the total bandwidth capacity of the given data centers 108 to efficiently distribute workloads amongst the available secondary data centers 108 in accordance with the various embodiments described herein.

At 1108, the method 1100 can comprise modifying (e.g., via data management component 110), by the system 100, the one or more data recovery schemes based on the first and/or second machine learning models to generate a modified data recovery scheme. For examples, the method 1100 can comprise modifying the one or more data recovery schemes in accordance with one or more modification identified by the first and/or second machine learning models and within a simulation environment. By modifying the data recovery schemes within a simulation of the given network 104 of data centers 108, the method 1000 can predict the successfulness of the given modified data recovery scheme prior to implementation across the network 104.

At 1110, the method 1100 can comprise analyzing (e.g., via assessment component 302), by the system 100, the one or more modified data recovery scheme to determine whether the modified data recovery schemes is predicted to improve the performance data and meet the one or more data recovery requirements (e.g., SLO targets, latency requirements, and/or location requirements) in comparison to the original data recovery scheme. For example, the analyzing at 1110 can comprise determining one or more assessment values in accordance with the various embodiments described herein. Modification predicted to improve the assessment values over previously established benchmarks can be implemented within the network 104; whereas modifications predicted to decrease assessment values, or leave assessment values unaffected, can be avoided from implementation within the network 104. In various embodiments, features 1104, 1106, 1108, and/or 1110 of the method 1100 can be repeated numerous times until all possibilities are explored by the machine learning models and/or until modifications predicted to improve the assessment values are identified.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
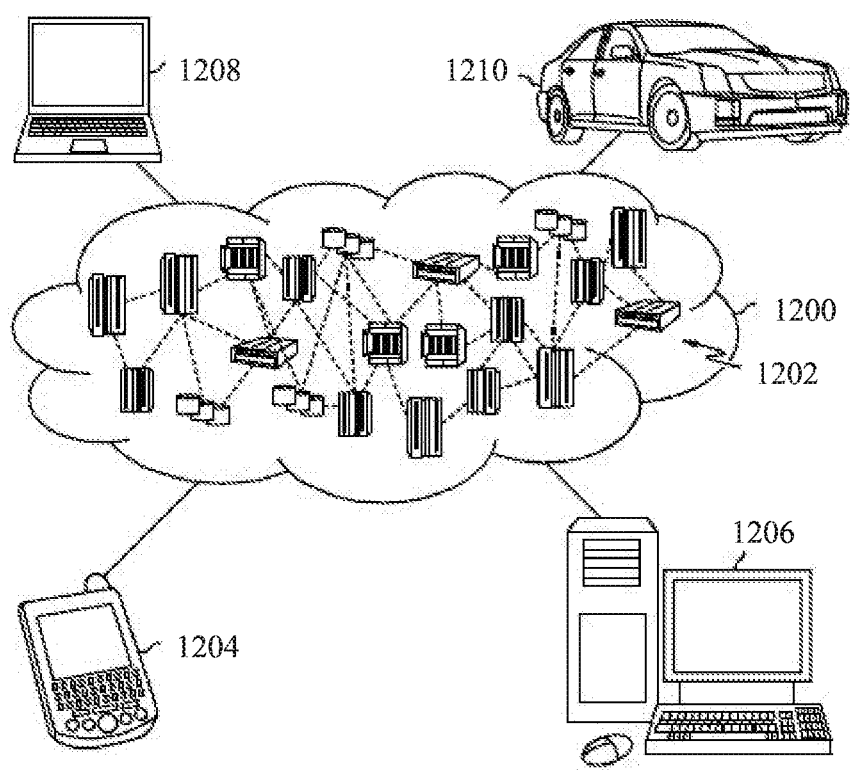
FIG. 12 depicts a cloud computing environment in accordance with one or more embodiments described herein.

Referring now to FIG. 12, illustrative cloud computing environment 1200 is depicted. As shown, cloud computing environment 1200 includes one or more cloud computing nodes 1202 with which local computing devices used by cloud consumers, such as, for example, personal digital assistant (PDA) or cellular telephone 1204, desktop computer 1206, laptop computer 1208, and/or automobile computer system 1210 may communicate. Nodes 1202 may communicate with one another. They may be grouped (not shown) physically or virtually, in one or more networks, such as Private, Community, Public, or Hybrid clouds as described hereinabove, or a combination thereof. This allows cloud computing environment 1200 to offer infrastructure, platforms and/or software as services for which a cloud consumer does not need to maintain resources on a local computing device. It is understood that the types of computing devices 1204-1210 shown in FIG. 12 are intended to be illustrative only and that computing nodes 1202 and cloud computing environment 1200 can communicate with any type of computerized device over any type of network and/or network addressable connection (e.g., using a web browser).

Figure 13:
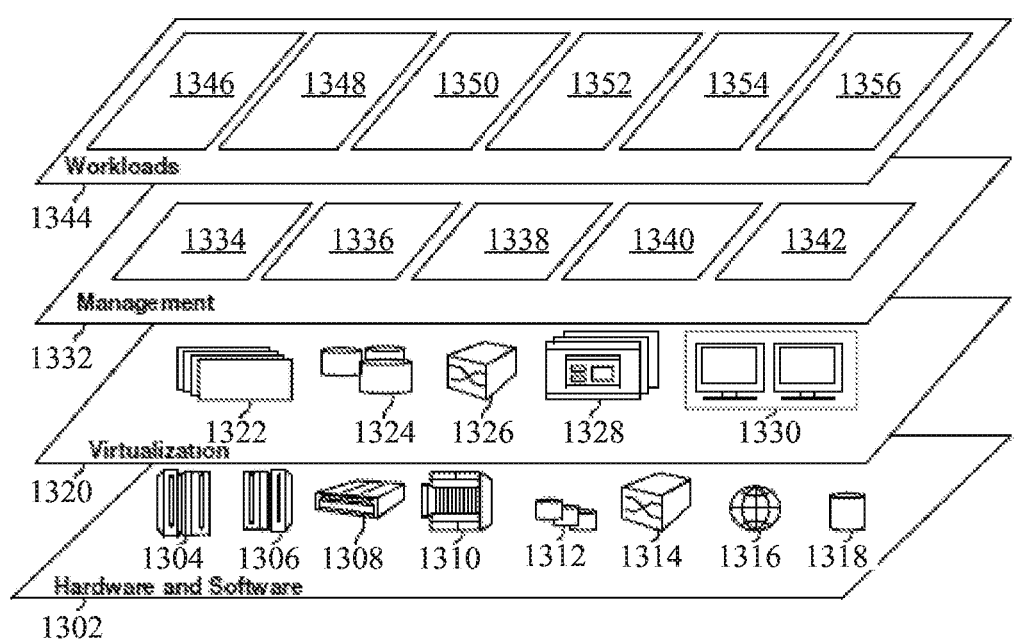
FIG. 13 depicts abstraction model layers in accordance with one or more embodiments described herein.

Referring now to FIG. 13, a set of functional abstraction layers provided by cloud computing environment 1200 (FIG. 12) is shown. Repetitive description of like elements employed in other embodiments described herein is omitted for sake of brevity. It should be understood in advance that the components, layers, and functions shown in FIG. 13 are intended to be illustrative only and embodiments of the invention are not limited thereto. As depicted, the following layers and corresponding functions are provided.

Hardware and software layer 1302 includes hardware and software components. Examples of hardware components include: mainframes 1304; RISC (Reduced Instruction Set Computer) architecture based servers 1306; servers 1308; blade servers 1310; storage devices 1312; and networks and networking components 1314. In some embodiments, software components include network application server software 1316 and database software 1318.

Virtualization layer 1320 provides an abstraction layer from which the following examples of virtual entities may be provided: virtual servers 1322; virtual storage 1324; virtual networks 1326, including virtual private networks; virtual applications and operating systems 1328; and virtual clients 1330.

In one example, management layer 1332 may provide the functions described below. Resource provisioning 1334 provides dynamic procurement of computing resources and other resources that are utilized to perform tasks within the cloud computing environment. Metering and Pricing 1336 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1338 provides access to the cloud computing environment for consumers and system administrators. Service level management 1340 provides cloud computing resource allocation and management such that service levels are met. Service Level Agreement (SLA) planning and fulfillment 1342 provide pre-arrangement for, and procurement of, cloud computing resources for which a future requirement is anticipated in accordance with an SLA.

Workloads layer 1344 provides examples of functionality for which the cloud computing environment may be utilized. Examples of workloads and functions which may be provided from this layer include: mapping and navigation 1346; software development and lifecycle management 1348; virtual classroom education delivery 1350; data, analytics processing 1352; transaction processing 1354; and data recovery 1356. Various embodiments of the present invention can utilize the cloud computing environment described with reference to FIGS. 12 and 13 to analyze performance data of various data centers 108 across a network 104, modify one or more data recovery schemes based on the performance data, and/or implement the modified data recovery schemes.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 14:
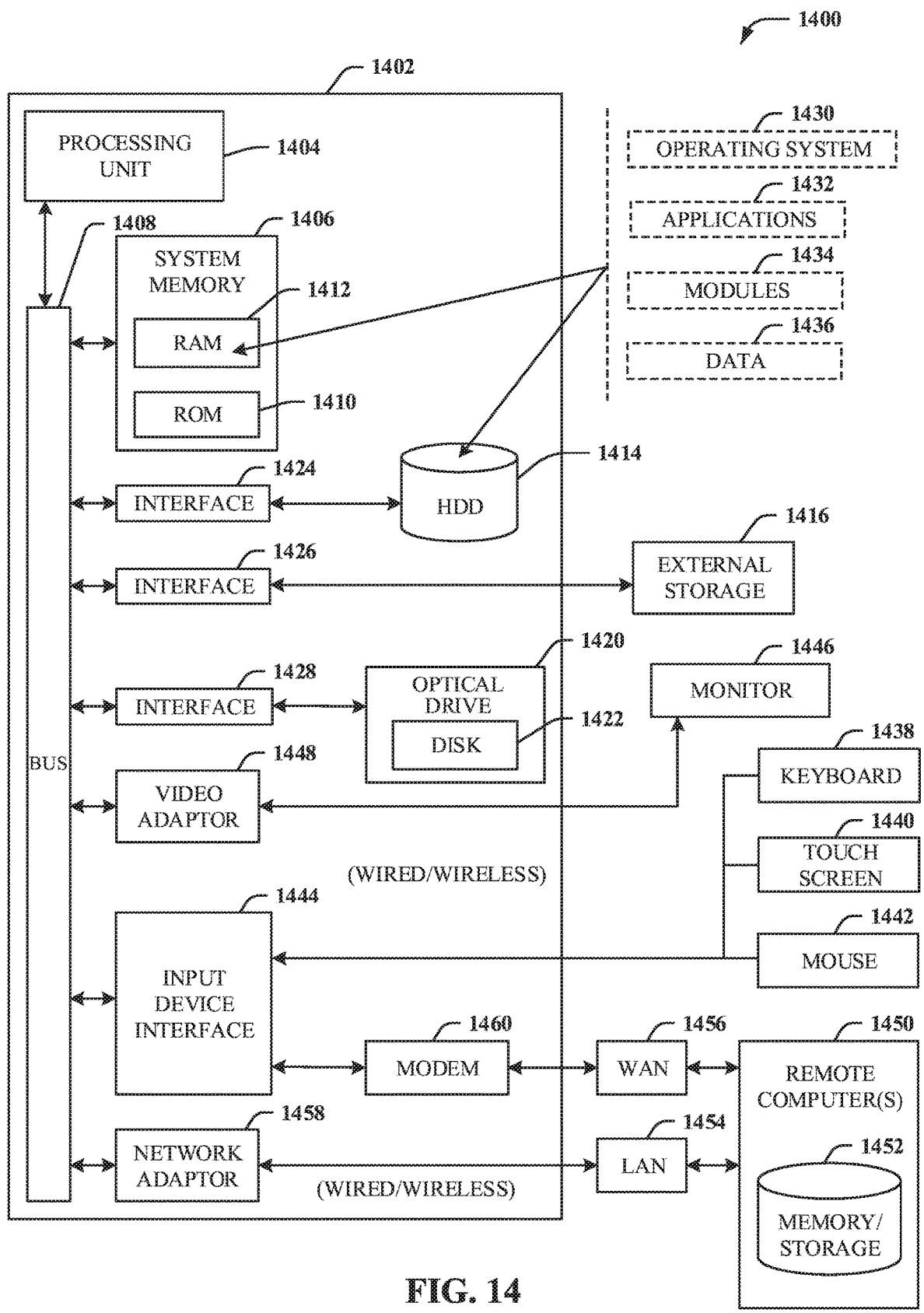
FIG. 14 illustrates a block diagram of an example, non-limiting operating environment in which one or more embodiments described herein can be facilitated.

In order to provide additional context for various embodiments described herein, FIG. 14 and the following discussion are intended to provide a general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system ("BIOS") can be stored in a non-volatile memory such as ROM, erasable programmable read only memory ("EPROM"), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive ("HDD") 1414 (e.g., EIDE, SATA), one or more external storage devices 1416 (e.g., a magnetic floppy disk drive ("FDD"), a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive ("SSD") could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The HDD interface 1424 can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine ("VM") of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1402, e.g., applied at the application execution level or at the operating system ("OS") kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network ("LAN") 1454 and/or larger networks, e.g., a wide area network ("WAN") 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point ("AP") disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor, operably coupled to the memory, and that executes the computer executable components stored in the memory, wherein the computer executable components comprise:
      a data management component that modifies a data recovery scheme based on performance data exhibited by a network of data centers and a data recovery requirement, wherein the data recovery scheme directs a relocation of data within the network, wherein the performance data regards a group of microservice applications comprised within the data; and a data optimization component that generates a machine learning model to optimize the relocation of the data based on the group of microservice applications, wherein the machine learning model identifies a relationship between a modification made to the data recovery scheme and the data recovery requirement based on the performance data of the group of microservice applications.

2. The system of claim 1, wherein the performance data comprises at least one type of information selected from a group consisting of location of the data centers, bandwidth of the network, latency of the network, bandwidth used by the data, latency exhibited during execution of the data, and latency exhibited during the relocation of the data.

3. The system of claim 2, wherein the data recovery requirement comprises at least a second type of information selected from a second group consisting of the location of the data centers and a service level objective.

4. The system of claim 1, wherein the data management component modifies the data recovery scheme to generate a modified data recovery scheme, and wherein the system further comprises:

an assessment component that analyzes the modified data recovery scheme to determine whether the modified data recovery scheme is predicted to achieve improved performance data and meet the data recovery requirement in comparison to the data recovery scheme; and a relocation component that performs the relocation of the data in accordance with the modified data recovery scheme based on the assessment component determining that the modified data recovery scheme is predicted to improve the performance data and meet the data recovery requirement.

5. The system of claim 1, wherein the performance data further regards at least one data center of the network, and wherein the system further comprises:

a data center optimization component that generates a machine learning model to optimize the relocation of the data based further on the at least one data center, wherein the machine learning model identifies a relationship between a second modification made to the data recovery scheme and the data recovery requirement based on the performance data of the at least one data center.

6. A system, comprising:

a memory that stores computer executable components; and a processor, operably coupled to the memory, and that executes the computer executable components stored in the memory, wherein the computer executable components comprise:

a data management component that generates a machine learning model to determine a modification to a data recovery scheme based on performance data exhibited by a network of data centers and a data recovery requirement, wherein the data recovery scheme directs a relocation of data within the network, wherein the performance data comprises latency exhibited during the relocation of the data;

an initialization component that removes a secondary data center candidate from the network of data centers based on the performance data, wherein the performance data regards a group of microservice applications comprised within the data and at least one data center of the network; and a data optimization component that generates a first portion of the machine learning model to optimize the relocation of the data based on the performance data of the group of microservice applications.

7. The system of claim 6, wherein the performance data further comprises at least one type of information selected from a group consisting of location of the data centers, bandwidth of the network, latency of the network, bandwidth used by the data, and latency exhibited during execution of the data, and wherein the data recovery requirement comprises at least one second member selected from a second group consisting of the location of the data centers and a service level objective.

8. The system of claim 6, wherein the performance data regards a group of microservice applications comprised within the data, and wherein the system further comprises:

a data optimization component that generates a first portion of the machine learning model to optimize the relocation of the data based on the performance data of the group of microservice applications.

9. The system of claim 8, wherein the performance data further regards at least one data center of the network, and wherein the system further comprises:

a data center optimization component that generates a second portion of the machine learning model to optimize the relocation of the data based further on the performance data of the at least one data center.

10. The system of claim 8, wherein the data management component further implements the modification to generate a modified data recovery scheme, and wherein the system further comprises:

an assessment component that analyzes the modified data recovery scheme to determine whether the modified data recovery scheme is predicted to achieve improved performance data and meet the data recovery requirement in comparison to the data recovery scheme.

11. A computer-implemented method, comprising:

generating, by a system operatively coupled to a processor, a machine learning model to determine a modification to a data recovery scheme based on performance data exhibited by a network of data centers and a data recovery requirement, wherein the data recovery scheme directs a relocation of data within the network sorting, by the system, the network of data centers based on an average available bandwidth of a data center of the network of data centers;

removing, by the system, a secondary data center candidate from the network of data centers based on the performance data, wherein the performance data regards a group of microservice applications comprised within the data and at least one data center of the network; and generating, by the system, a first portion of the machine learning model to optimize the relocation of the data based on the performance data of the group of microservice applications.

12. The computer-implemented method of claim 11, wherein the performance data comprises at least one member selected from a group consisting of location of the data centers, bandwidth of the network, latency of the network, bandwidth used by the data, latency exhibited during execution of the data, and latency exhibited during the relocation of the data, and wherein the data recovery requirement comprises at least one second member selected from a second group consisting of the location of the data centers and a service level objective.

13. The computer-implemented method of claim 11, further comprising:
generating, by the system, a second portion of the machine learning model to optimize the relocation of the data based further on the performance data of the at least one data center.

14. The computer-implemented method of claim 13, wherein the modification generates a modified data recovery scheme, and wherein the computer-implemented method further comprises:
analyzing, by the system, the modified data recovery scheme to determine whether the modified data recovery scheme is predicted to achieve improved performance data and meet the data recovery requirement in comparison to the data recovery scheme.

15. A computer-implemented method, comprising:
modifying, by a system operatively coupled to a processor, a data recovery scheme based on performance data exhibited by a network of data centers, a geographical boundary and a data recovery requirement, wherein the data recovery scheme directs a relocation of data within the network; and
sorting, by the system, microservice groups according to a ratio of an average application latency over a target application latency, wherein the sorting comprises sorting ones of a microservices group according to those of the microservices group failing one or more service level objective targets followed by or preceded by those of the microservices group at risk for failing the one or more service level objective targets;
removing, by the system, a secondary data center candidate from the network of data centers based on the performance data, wherein the performance data regards a group of microservice applications comprised within the data and at least one data center of the network; and
generating, by the system, a machine learning model to optimize the relocation of the data based on the group of microservice applications.

16. The computer-implemented method of claim 15, wherein the performance data comprises at least one type of information selected from a group consisting of location of the data centers, bandwidth of the network, latency of the network, bandwidth used by the data, latency exhibited during execution of the data, and latency exhibited during the relocation of the data, and wherein the data recovery requirement comprises at least one second type of information selected from a second group consisting of the location of the data centers and a service level objective.

17. The computer-implemented method of claim 15, wherein the performance data further regards at least one data center of the network, and wherein the computer-implemented method further comprises:
generating, by the system, a second machine learning model to optimize the relocation of the data based further on the at least one data center.

18. The computer-implemented method of claim 17, wherein the modifying is based on the machine learning model and the second machine learning model to generate a modified data recovery scheme, and wherein the computer-implemented method further comprises:

analyzing, by the system, the modified data recovery scheme to determine whether the modified data recovery scheme is predicted to improve the performance data and meet the data recovery requirement in comparison to the data recovery scheme.

19. A computer program product for adaptively distributing data within a network of data centers, the computer program product comprising a computer readable storage medium having program instructions embodied therewith, the program instructions executable by a processor to cause the processor to:
modify, by the processor, a data recovery scheme based on performance data exhibited by a network of data centers and a data recovery requirement, wherein the data recovery scheme directs a relocation of data within the network;
sort, by the processor, the network of data centers based on an average available bandwidth of a data center of the network of data centers;
remove, by the processor, a secondary data center candidate from the network of data centers based on the performance data, wherein the performance data regards a group of microservice applications comprised within the data and at least one data center of the network; and
generate, by the processor, a first machine learning model to optimize the relocation of the data based on the group of microservice applications.

20. The computer program product of claim 19, wherein the performance data comprises at least one member selected from a group consisting of location of the data centers, bandwidth of the network, latency of the network, bandwidth used by the data, latency exhibited during execution of the data, and latency exhibited during the relocation of the data, and wherein the data recovery requirement comprises at least one second member selected from a second group consisting of the location of the data centers and a service level objective.

21. The computer program product of claim 20, wherein the relocation of data is performed via a cloud computing environment.

22. The computer program product of claim 19, wherein the program instructions further cause the processor to:
generate, by the processor, a second machine learning model to optimize the relocation of the data based further on the at least one data center.

23. The computer program product of claim 19, wherein the program instructions are further executable to cause the processor to:
sort, by the processor, the microservice groups according to a ratio of an average application latency over a target application latency resulting in a sort of the microservice groups according to ones of a microservices groups failing one or more service level objective targets, followed by other ones of the microservice groups at risk for failing the one or more service level objective targets; and
direct, by the processor, one or more new relocation destinations for ones of the microservice groups identified as failing the one or more service level objective targets or ones of the microservice groups at risk of failing the one or more service level objective targets.

* * * * *